April 29, 1969      D. J. NAHIGIAN      3,440,755
ARTIFICIAL FISHING LURE
Filed June 16, 1967
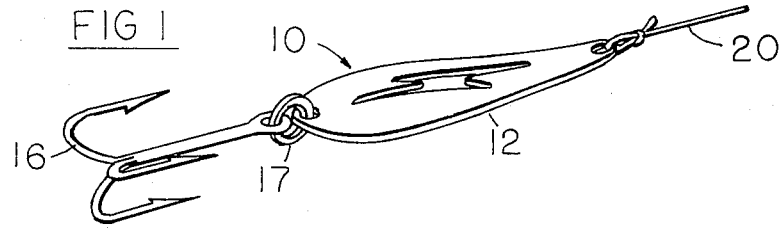
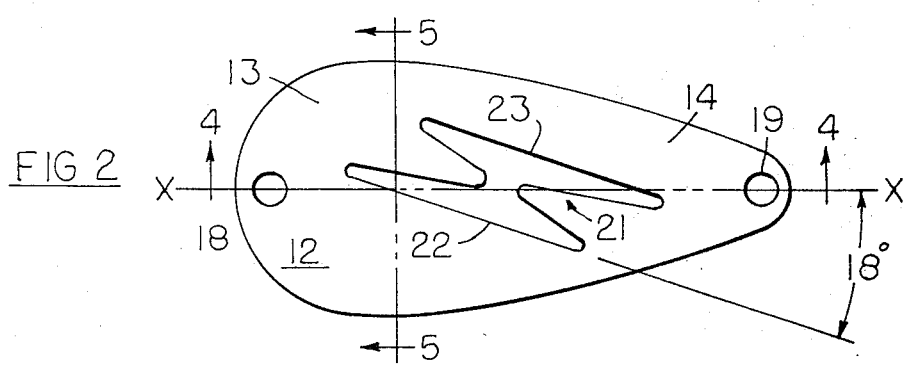
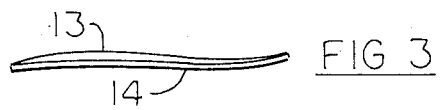
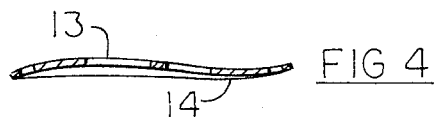
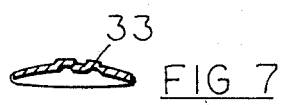
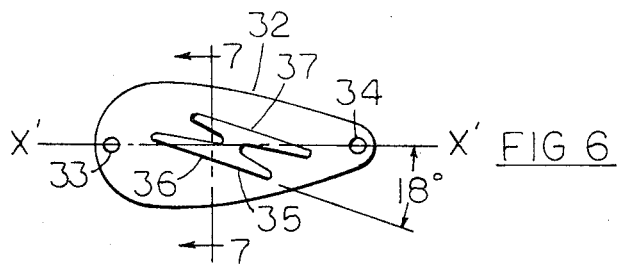
INVENTOR
DAVID J. NAHIGIAN
BY
William Frederick Werner
ATTORNEY

United States Patent Office 3,440,755
Patented Apr. 29, 1969

3,440,755
ARTIFICIAL FISHING LURE
David J. Nahigian, 179 Negansett Ave.,
Warwick, R.I. 02888
Filed June 16, 1967, Ser. No. 646,637
Int. Cl. A01k 85/00
U.S. Cl. 43—42.06                    9 Claims

ABSTRACT OF THE DISCLOSURE

A fishing lure spoon having a reverse curve along its longitudinal axis and a simple curve in one direction in planes at any point along the axis at right angles to the axis. The lure has a noise producing surface discontinuity in the form of an opening through the lure body or an embossment on the surface outermost of the simple curve. The discontinuity is zigzag shaped, is approximately at the center of the lure body, and is asymmetrical relative to the longitudinal axis thereof. The middle portion of the discontinuity straddles said longitudinal axis.

Background of the invention

This invention relates to fishing lures and more particularly to an artificial lure termed a "spoon."

It has been found that fishing lures generally attempt to attract fish by one or more of the following; motion, sound, color, smell. Of these it appears that color attraction is least effective as it appears that fish merely distinguish color as shades of gray rather than as the colors themselves. Smell is a difficult and expensive approach to successfully achieve. Therefore, most artificial lures rely primarily on motion as its dominant attraction. Illustrative examples of such lures may be seen in United States Patents Nos. 1,558,249 and 3,221,435. As seen in these patents a particular motion or orientation is achieved by impressions in projections from the sheet metal bodies.

Sound has been the primary attraction in the province of fishing plugs. Plugs known as poppers are examples of this type. However, apparently this form of attraction has been a secondary consideration in the design of spoon type artificial lures.

Summary of the invention

In the novel construction shown and described herein both motion and sound are the attractions which are used in a spoon type lure to make it singularly effective.

Accordingly an object of the present invention is to provide an artificial lure which will wiggle during retrieve to duplicate the motion of a small fish in a swaying and side weaving motion and simultaneously will emit vibrating sounds which increase the attention inducement of the lure to fish.

A further object of the present invention is, in addition to the above, to provide an artificial spoon type lure which will sink at rest and while doing so stay on an even keel.

Further objects and advantages will become apparent from the following description and drawing.

Brief description of the drawing

FIGURE 1 is a perspective view of a preferred embodiment of the invention.

FIGURE 2 is a top plan view of the embodiment of FIGURE 1.

FIGURE 3 is a side elevational view of the embodiment of FIGURE 1.

FIGURE 4 is a section view taken along line 4—4 of FIGURE 2.

FIGURE 5 is a section view taken along line 5—5 of FIGURE 2.

FIGURE 6 is a top plan view of another embodiment of the invention.

FIGURE 7 is a section view taken along line 7—7 of FIGURE 6.

Description of preferred embodiments

Referring to the drawing (FIGS. 1–5) in greater particularity, 10 generally indicates one embodiment of the present invention, a spoon type artificial lure. This lure has a somewhat ovate shaped body 12 which is formed with a reverse curve along its longitudinal axis x—x. At right angles to the axis x—x the body 12 is formed in section as simple curves or arc segments (see FIG. 5). As a result, the body can be said to curve upwardly along the axis x—x at its forward end portion 13 and curve downwardly along the axis x—x at its rearward end portion 14. The front or forward end in this case is the end to which a hook 16 is fastened by means of a ring 17 passing through a hole 18 in the lure at the front end. At the opposite, or rear end is another hole 19 to which a leader 20 or fishing line may be connected. In the embodiment of FIGS. 1 and 2 a substantially zigzag lightning bolt shaped opening 21 is punched through the body 12 approximately at its center. As shown in FIGURE 2 the opening has two longitudinal straight parallel sides 22 and 23. These sides are presented at an angle of 18 degrees to the longitudinal axis x—x.

The embodiment of FIGURES 6 and 7 has a body 32 which is similar to the body 12. It has holes 33 and 34 corresponding respectively to holes 18 and 19. Rather than an opening such as 21 in body 12, the body 32 has a raised embossment 35 which is also zigzag lightning bolt shaped with two longitudinal straight parallel sides 36 and 37 which are presented at an angle of 18 degrees to the longitudinal axis x'—x'. The embossment extends upwardly from the convex surface of the arc at right angles to the axis x'—x'.

In both the embodiments of FIGURES 1–5 and FIGURES 6–7 the opening 21 and embossment 35 can be termed as surface discontinuities as they interrupt the smooth curving shape of the surfaces on both bodies 12 and 32 respectively. The discontinuities are each located asymmetrical relative to the longitudinal axis of the spoon body and the middle portion of the discontinuity straddles said longitudinal axis.

After being cast into the water either embodiment during retrieve will wiggle with a swaying side-weaving motion. As the lure passes through the water the walls of the surface discontinuity of either embodiment will be struck by water causing the lure to emit vibrating sounds which are desirable because of their attraction to fish. With attractive sounds and motion it is easy to understand why fish find this lure so alluring. Another desirable feature of its use is that when the lure is stopped during retrieve it will sink on an even keel. This is due to the balance caused by the compound or reverse curve, of the surfaces along the lure's longitudinal axis.

The lure may be fabricated from sheet metal, plastic or cast metal.

Having shown and described a preferred embodiment of the present invention, by way of example, it should be realized that structural changes could be made and other examples given without departing from either the spirit or scope of this invention.

I claim:
1. A fishing lure comprising a spoon shaped body,
    (a) being ovate shaped with a reverse curve along its longitudinal axis,
    (b) being curved one way in any plane at right angles to said longitudinal axis.
    (c) containing a substantially zigzag, lightning shaped surface discontinuity approximately at the center of the body, said discontinuity being asymmetrical relative to the longitudinal axis of the body and the middle portion of the discontinuity straddling the longitudinal axis of the body.

2. A fishing lure as called for in claim 1 wherein said surface discontinuity has two substantially longitudinally straight parallel sides.

3. A fishing lure as called for in claim 2 wherein said parallel sides are oriented at an angle of approximately 18 degrees to said longitudinal axis.

4. A fishing lure as called for in claim 3 wherein said surface discontinuity is an opening through said body.

5. A fishing lure as called for in claim 3 wherein said surface discontinuity is an embossment on the surface of said body.

6. A fishing lure as called for in claim 5 wherein said embossment is on the outer surface of said curve in any plane at right angles to said longitudinal axis.

7. A fishing lure comprising a spoon shaped body,
 (a) being ovate shaped with a reverse curve along its longitudinal axis,
 (b) being outwardly curved in a simple arc in the same direction in a plane at right angles to said axis at any point along said axis.
 (c) containing a substantially zigzag lightning shaped surface discontinuity approximately at the center of the body, said discontinuity being asymmetrical relative to the longitudinal axis of the body and the middle portion of the discontinuity straddling the longitudinal axis of the body, said discontinuity,
  (1) having two straight parallel substantially longitudinal sides oriented approximately at an angle of 18 degrees to said axis,
 (d) including means for attaching a fish hook at one end and a fish line at the opposite end.

8. A fishing lure as called for in claim 7 wherein said discontinuity is an opening through said body.

9. A fishing lure as called for in claim 7 wherein said discontinuity is an embossment on the outwardly curved portion of said arc.

References Cited

UNITED STATES PATENTS

| | | | |
|---|---|---|---|
| Re. 16,636 | 5/1927 | Skelly et al. | 43—42.5 X |
| 1,558,249 | 10/1925 | De Zeng | 43—42.34 |
| 1,809,663 | 6/1931 | Allen | 43—42.5 |
| 1,854,028 | 4/1932 | Gruenhagen | 43—42.5 |
| 2,203,473 | 6/1940 | Shannon | 43—42.06 |
| 2,562,743 | 7/1951 | Schindler et al. | 43—42.5 X |
| 2,597,035 | 5/1952 | Rickard | 43—42.5 X |
| 3,146,542 | 9/1964 | Davis | 43—42.5 |

SAMUEL KOREN, *Primary Examiner.*

U.S. Cl. X.R.

43—42.31, 42.5